US012750760B2

(12) United States Patent
Hoffmann

(10) Patent No.: US 12,750,760 B2
(45) Date of Patent: Sep. 29, 2026

(54) APPLICATION FUNCTION RELOCATION PROCEDURE

(71) Applicant: NOKIA SOLUTIONS AND NETWORKS OY, Espoo (FI)

(72) Inventor: Klaus Hoffmann, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 861 days.

(21) Appl. No.: 18/012,473

(22) PCT Filed: Jun. 25, 2020

(86) PCT No.: PCT/IB2020/056036

§ 371 (c)(1),
(2) Date: Dec. 22, 2022

(87) PCT Pub. No.: WO2021/260420

PCT Pub. Date: Dec. 30, 2021

(65) Prior Publication Data

US 2024/0334300 A1 Oct. 3, 2024

(51) Int. Cl.

*H04W 40/20* (2009.01)
*H04W 8/18* (2009.01)
*H04W 36/32* (2009.01)

(52) U.S. Cl.

CPC ........... *H04W 40/20* (2013.01); *H04W 8/183* (2013.01); *H04W 36/322* (2023.05)

(58) Field of Classification Search

CPC ................. H04W 40/20; H04W 8/183; H04W 36/322; H04W 36/12; H04W 36/385; H04W 88/18; H04W 36/00

(Continued)

(56) References Cited

U.S. PATENT DOCUMENTS 10,841,974 B1 * 11/2020 Young .................. H04W 76/30
2013/0336179 A1 * 12/2013 Rubin ...................... H04J 3/14
370/281

(Continued)

OTHER PUBLICATIONS

International Search Report and Written Opinion dated Mar. 15, 2021 corresponding to International Patent Application No. PCT/IB2020/056036.

(Continued)

*Primary Examiner* — Michael Y Mapa
(74) *Attorney, Agent, or Firm* — SQUIRE PATTON BOGGS (US) LLP

(57) ABSTRACT

An apparatus for use by a network element or function configured to provide an application function providing a service in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to generate and send, to a communication network control element or function of the communication network, an indication that a change from a first application function currently providing the service to a communication session conducted in the communication network to a second application function providing the service to the communication session from now on takes place, wherein the indication is configured to cause an event in the communication network to switch a communication path from the first application function to the second application function.

19 Claims, 9 Drawing Sheets

(58) Field of Classification Search
USPC .......................... 370/329, 331; 455/436–444
See application file for complete search history.

(56) References Cited

U.S. PATENT DOCUMENTS

| | | | | |
|---|---|---|---|---|
| 2018/0192471 | A1 | 7/2018 | Li et al. | |
| 2019/0215731 | A1* | 7/2019 | Qiao | H04W 24/10 |
| 2020/0186462 | A1 | 6/2020 | D'Acunto et al. | |
| 2021/0195554 | A1* | 6/2021 | Singh | H04W 60/04 |
| 2021/0320979 | A1* | 10/2021 | Kweon | H04W 36/12 |

OTHER PUBLICATIONS

Samsung, "Clarification on the late notifation for the target AF," 3GPP Draft, S2-2003120, 3GPP TSG-SA WG2 Meeting #138-E, E-meeting, Apr. 20-24, 2020, Apr. 10, 2020, XP051874626.

3GPP TR 23.748 V0.4.0 (Jun. 2020), Technical Report, 3rd Generation Partnership Project; Technical Specification Group Services and System Aspects; Study on enhancement of support for Edge Computing in 5G Core network (5GC) (Release 17), Jun. 23, 2020, XP051904405.

Nokia et al., "KI #2: Solution #55 Removal of FFS," 3GPP Draft, S2-2009167, 3GPP TSG-WG SA2 Meeting #142E e-meeting, Elbonia, Nov. 16-20, 2020, Nov. 23, 2020, XP051958206.

3GPP TS 23.501 V16.4.0 (Mar. 2020), Technical Specification, 3rd Generation Partnership Project; Technical Specification Group Services and System Aspects; System architecture for the 5G System (5GS); Stage 2 (Release 16), Mar. 2020.

3GPP TS 23.502 V16.4.0 (Mar. 2020), Technical Specification, 3rd Generation Partnership Project; Technical Specification Group Services and System Aspects; Procedures for the 5G System (5GS); Stage 2 (Release 16), Mar. 2020.

* cited by examiner

APPLICATION FUNCTION RELOCATION PROCEDURE

BACKGROUND

Field

Examples of embodiments relate to apparatuses, methods, systems, computer programs, computer program products and (non-transitory) computer-readable media usable for conducting a relocation process for an application function (AF) in a communication network, such as a wireless communication network based on 3GPP standards, and in particular to apparatuses, methods, systems, computer programs, computer program products and (non-transitory) computer-readable media usable for conducting a relocation procedure of an AF deployed in an edge hosting environment of a communication network, which is required e.g. in case of low latency requirements, with challenging conditions for service continuity, e.g. due to highly mobile terminal stations, like UEs.

Background Art

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:

3GPP 3rd Generation Partnership Project
4G fourth generation
5G fifth generation
5GS 5G system
ACK acknowledgement
AF application function
AMF access and mobility function
AN access network
BS base station
CN core network
CP control plane
CPU central processing unit
DN data network
DNN data network name
DNAI data network access ID
EAS edge application server
eNB evolved node B
ETSI European Telecommunications Standards Institute
gNB next generation node B
ID identifier, identification
IEEE Institute of Electrical and Electronics Engineers
LTE Long Term Evolution
LTE-A LTE Advanced
NEF network exposure function
NF network function
NG new generation
NW network, network side
PCF policy control function
PCRF policy and charging rules function
PDU packed data unit
PGW packet gateway
RAN radio access network
S-NSSAI single network slice selection assistance information
SEPP security edge protection proxy
SCEF service capability exposure function
SGW serving gateway
SMF session and mobility management function
SUPI subscription permanent identifier
UDR unified data repository
UE user equipment
UMTS universal mobile telecommunication system
UP user plane
UPF user plane function
URLLC ultra-reliable low latency communications According to an example of an embodiment, there is provided, for example, an apparatus for use by a network element or function configured to provide an application function providing a service in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to generate and send, to a communication network control element or function of the communication network, an indication that a change from a first application function currently providing the service to a communication session conducted in the communication network to a second application function providing the service to the communication session from now on takes place, wherein the indication is configured to cause an event in the communication network to switch a communication path from the first application function to the second application function.

Furthermore, according to an example of an embodiment, there is provided, for example, a method for use in a network element or function configured to provide an application function providing a service in a communication network, the method comprising generating and sending, to a communication network control element or function of the communication network, an indication that a change from a first application function currently providing the service to a communication session conducted in the communication network to a second application function providing the service to the communication session from now on takes place, wherein the indication is configured to cause an event in the communication network to switch a communication path from the first application function to the second application function.

By means of these measures, according to examples of embodiments, it is possible that the application function informs other network elements or functions in the communication network about a change of the application function, due to various reasons, such as movement of UE or the like out of responsibility area, load (congestion), de-instantiation/deactivation of the currently responsible AF, and the like, so that measures required for service continuity with regard to the new application function can be taken.

According to further refinements, these examples may include one or more of the following features:

- as the indication that a change from the first application function to the second application function takes place, one of a specific signaling message including an information about the change, and one of a PUT or PATCH request for reconfiguring or modifying subscription data held in the communication network control element or function may be generated and provided; due to these measures, according to examples of embodiments, a suitable type of indication can be used, allowing e.g. to provide a tailored and optimized indication in the form of a specific message, or to use existing signaling resources and means which enables a simplified implementation of examples of embodiments also into existing systems;

in the indication, address information related to the location of the second application function may be included; due to this measure, according to examples of embodiments, it is possible to improve the signaling towards the new application function from the network side, including the transmission of notifications and requests;

the indication may be sent to at least one communication network control element or function of the communication network, the at least one communication network control element or function includes at least one of a network exposure element or function, a policy control element or function, a security edge protection proxy element or function, a serving gateway element or function, a packet gateway element or function, a network repository element or function, a policy and charging rules element or function, a service capability exposure element or function; due to these measures, according to examples of embodiments, it is possible to provide the indication to various network elements or functions which allows to adjust network measures according to the needs of the operator, including e.g. a direct information of the network elements or functions, such as the NEF or SMF, which are involved in the communication path switching, and network elements or function, such as repository functions, which can inform other elements or function upon request or by directly sending the information regarding the indication being received;

when the application function provided by the network element or function is the first application function, it may be detected that the first application function currently providing the service to the communication session conducted in the communication network is not able to continue the provision of the service, the second application function providing the service to the communication session from now on may be determined, and context information of the first application function may be transferred to the second application function; due to this measure, according to examples of embodiments, it is possible to provide the indication from the currently used application function, wherein this application function can initiate the process for the change of the application function, e.g. upon an own detection that this is required, or upon receiving corresponding information from another side; using the first application function for indication provision allows to increase flexibility of network configuration and to start the change process from the already connected application function;

when the application function provided by the network element or function is the first application function, in addition, when it is detected that the first application function currently providing the service to the communication session conducted in the communication network is not able to continue the provision of the service, an instantiation of the second application function may be triggered, and the second application function may be determined by obtaining an indication of existence of the second application function after instantiation thereof is completed; due to this measure, according to examples of embodiments, it is possible that the currently used application function triggers the instantiation of the new application function, and the indication is provided to the network side when the new application function indicates existence; this allows to increase flexibility of network configuration and to start the change process from the already connected application function;

when the application function provided by the network element or function is the first application function, in addition, it may be detected that the first application function currently providing the service to the communication session conducted in the communication network is not able to continue the provision of the service on the basis of one of information provided by the communication network, information obtained by the network element or function or information provided from an external network orchestrator element or function; due to this measure, according to examples of embodiments, it is possible that the currently used application function detects the requirement to change the application function from different sources, such as an own measurement of conditions (e.g. for congestion state), an indication from another external source, such as a network orchestrator, e.g. for balancing the network load, or from the network informing e.g. about a change of location of a UE or the like requiring that also the application function is to be changed; this allows to further increase flexibility of network configuration;

when the application function provided by the network element or function is the first application function, in addition, notifications and requests received from the communication network concerning network related events may be forwarded to the second application function, forwarding of the notifications and requests to the second application function may be stopped when either a predetermined amount of time is lapsed or an indication is received that the communication path from the communication network control element or function to the second application function is established; due to this measure, according to examples of embodiments, it is possible that the currently used application function forwards information, such as notifications or requests, to the new application function even before it is connected to the session, so that service continuity is ensured after the change; furthermore, a suitable stop condition is provided allowing to safe resources after the change by avoiding unnecessary communication between the AFs;

when the application function provided by the network element or function is the second application function, context information of the first application function may be received and processed, and, from the first application function or a communication network control element or function of the communication network, notifications and requests originating from the communication network concerning network related events may be received and processed; due to this measure, according to examples of embodiments, it is possible to provide the indication from the new application function, wherein this application function can receive information required for operation and for service continuity from different sources; using the second application function for indication provision allows to increase flexibility of network configuration, while service continuity is improved;

when the application function provided by the network element or function is the second application function, the presence of the second application function may be indicated to the first application function; due to this measure, according to examples of embodiments, it is possible that the currently used application function is informed about the presence of the new application function by the new application function itself; due to this, network load is reduced by direct communication and information between the AFs;

the communication network may be based on a 3GPP standard and the network element or function configured to provide the application function may be an application server located at an edge environment of the communication network.

In addition, according to an example of an embodiment, there is provided, for example, an apparatus for use by a first communication network control element of function of a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to receive and process an indication that a change from a first application function currently providing a service to a communication session conducted in the communication network to a second application function providing the service to the communication session from now on takes place, and to cause a switch of a communication path in the communication network from the first application function to the second application function on the basis of the indication.

Furthermore, according to an example of an embodiment, there is provided, for example, a method for use in a first communication network control element of function of a communication network, the method comprising receiving and processing an indication that a change from a first application function currently providing a service to a communication session conducted in the communication network to a second application function providing the service to the communication session from now on takes place, and causing a switch of a communication path in the communication network from the first application function to the second application function on the basis of the indication.

By means of these measures, according to examples of embodiments, it is possible that the communication network, i.e. a communication network control element or function such as an NEF or the like, becomes aware of the fact that a change of the application function, due to various reasons, such as movement of UE or the like out of responsibility area, load (congestion), de-instantiation/deactivation of the currently responsible AF, and the like, takes place so that measures required for service continuity with regard to the new application function can be taken.

According to further refinements, these examples may include one or more of the following features:

as the indication that a change from the first application function to the second application function takes place, one of a specific signaling message from one of the first application function and the second application function including an information about the change, one of a PUT or PATCH request from one of the first application function and the second application function for reconfiguring or modifying subscription data held in the communication network control element or function may be received and processed; due to these measures, according to examples of embodiments, a suitable type of indication can be used, allowing e.g. to provide a tailored and optimized indication in the form of a specific message, or to use existing signaling resources and means which enables a simplified implementation of examples of embodiments also into existing systems;

in the indication, address information related to the location of the second application function may be received and processed; due to this measure, according to examples of embodiments, it is possible to improve the signaling towards the new application function from the network side, including the transmission of notifications and requests;

at least one second communication network control element or function of the communication network may be informed that a change from the first application function to the second application function takes place, on the basis of the received indication; due to this measure, according to examples of embodiments, it is possible to provide information about the change of the application function to various network elements or functions which allows to adjust network measures according to the needs of the operator, including e.g. information of the network elements or functions, such as the SMF, which are involved in the communication path switching, and network elements or function, such as repository functions, which can inform other elements or function upon request or by directly sending the information regarding the indication being received;

the first communication network control element or function may include at least one of a network exposure element or function, a policy control element or function, a serving gateway element or function, a packet gateway element or function, a network repository element or function, a policy and charging rules element or function, a service capability exposure element or function, and the second communication network control element or function may include at least one of a policy control element or function, a security edge protection proxy element or function, a serving gateway element or function, a packet gateway element or function, a session management element or function, an access and mobility element or function;

notifications and requests may be forwarded to the first application function concerning network related events until the communication path is established to the second application function, and forwarding the notifications and requests to the first application function may be stopped and the notifications and requests may be forwarded to the second application function when the communication path to the second application function is established; due to this measure, according to examples of embodiments, it is possible that the currently used application function is used for forwarding information, such as notifications or requests, to the new application function even before it is connected to the session, so that service continuity is ensured after the change; furthermore, a suitable stop condition is provided allowing to safe resources after the change of the AFs;

the communication network may be based on a 3GPP standard and the first and second application functions may be provided by an application server located at an edge environment of the communication network.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
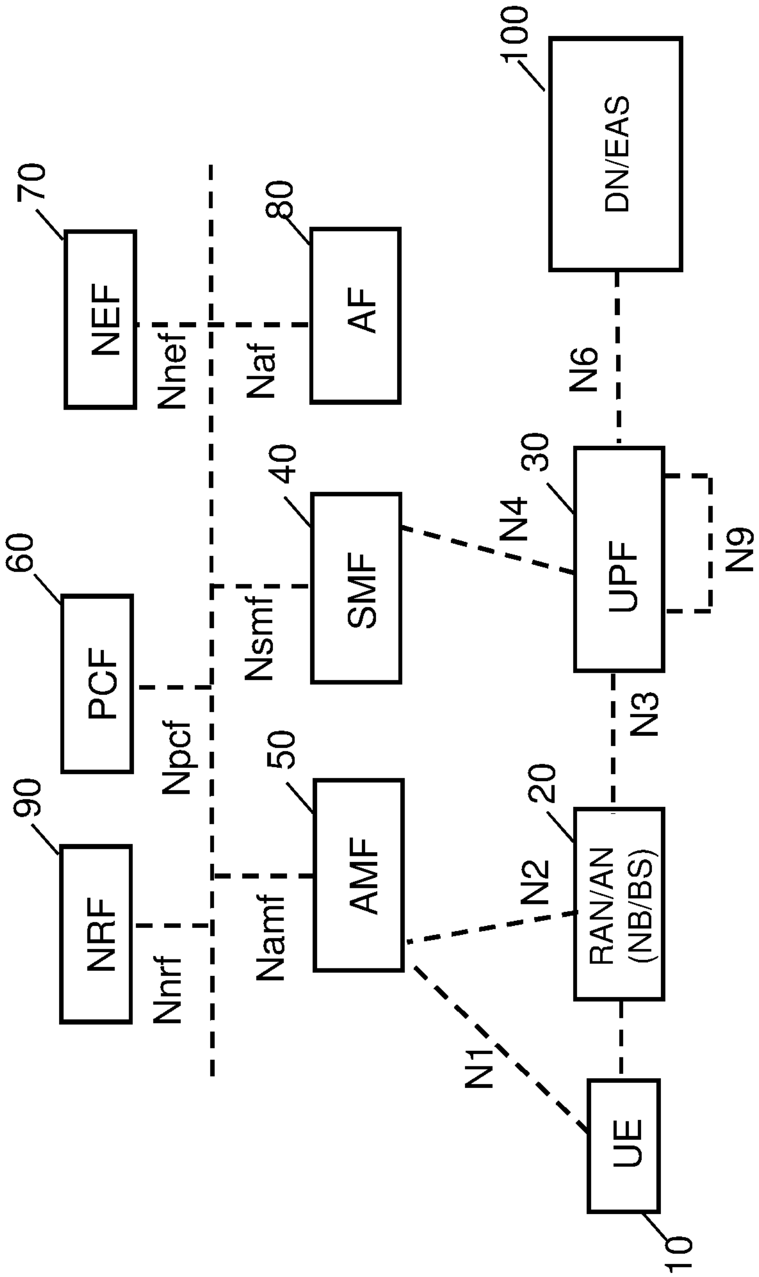
FIG. 1 shows a diagram illustrating an example of a system architecture of a wireless communication network in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more end points (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

New communication systems, such as the 5G System (5GS), are developed in order to support new business models such as those for IoT and enterprise managed networks. Services such as unmanned aerial vehicle control, augmented reality, and factory automation are intended to be provided. Network flexibility enhancements support self-contained enterprise networks, installed and maintained by network operators while being managed by the enterprise. Enhanced connection modes and evolved security facilitate support of massive IoT, expected to include tens of millions of UEs sending and receiving data over the 5G network.

Communication services supporting such applications need to be ultra-reliable, dependable with a high communication service availability, and often require low or (in some cases) very low end-to-end latency.

Edge computing defines a network architecture that enables, for example, cloud computing capabilities and an IT service environment at the edge of a cellular communication network, such as a 5GS. Edge computing allows that by running applications and performing related processing tasks closer to a user, network congestion is reduced and application performance is improved. Edge computing configurations may be is designed to be implemented at cellular base stations such as gNBs or the like, or other edge nodes, and enable flexible and rapid deployment of new applications and services for customers. Combining elements of information technology and telecommunications networking, edge computing also allows cellular operators to open their RAN to authorized third parties, such as application developers and content providers.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks where mobile communication principles are combined with edge computing approaches, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

First, for illustrative purposes, a network architecture example based on 5GS principles is described in which examples of embodiments can be implemented.

Specifically, FIG. 1 shows a diagram illustrating a first example of a system architecture of a wireless communication network based on 5GS in which examples of embodiments are implementable. It is to be noted that in the illustration of FIG. 1 a so-called service based interface definition is used. Furthermore, it is to be noted that the illustration in FIG. 1 shows only parts of a complete network architecture which are useful for understanding principles of embodiments of the disclosure.

As shown in FIG. 1, a 5GS based network is connected to one or more edge application servers (EAS) hosted in an edge hosting environment. Details regarding examples of possible relationships between the EAS and 5GS are defined, for example, in 3GPP specification TS 23.501.

The access network structure of the network is represented by RAN/AN 20 which is, for example, a base station (BS or NB) using a NR RAT and/or an evolved LTE base station, or a general base station including e.g. non-3GPP access, e.g., Wi-Fi.

A core network architecture shown in FIG. 1 applied for a 5GS network comprises various NFs. As shown in FIG. 1, the CN NFs comprises, amongst others (not shown), an AMF 50, a session management function (SMF) 40, a policy control function (PCF) 60, a network exposure function (NEF) 70, a network repository function (NRF) 90, and one or more user plane function(s) (UPF) 30.

The AMF 50 provides UE-based authentication, authorization, mobility management, etc. A UE (e.g. UE 10) even using multiple access technologies is basically connected to a single AMF because the AMF 50 is independent of the access technologies.

The SMF 40 sets up and manages sessions according to network policy. The SMF 40 is responsible, for example, for session management and allocates IP addresses to UEs. Furthermore, it selects and controls the UPF 30 for data transfer.

It is to be noted that it is also possible that in case the UE 10 has e.g. multiple sessions (communication connections), different SMFs may be allocated to each session to manage them individually and possibly provide different functionalities per session.

The UPF 30 can be deployed in various configurations and locations, according to the service type. Functions of the UPF 30 are e.g. QoS handling for user plane, packet routing and forwarding, packet inspection and policy rule enforcement, traffic accounting and reporting. The UPF 30 connects to a data network (DN) 100 on which one or more edge application servers providing a platform for application functions (AF) 80 are provided.

The PCF 60 provides a policy framework incorporating network slicing, roaming and mobility management, similar to a policy and charging rules function in a 4G network.

The NRF 90 maintains an updated repository of all the 5G elements available in the operator's network along with the services provided by each of the elements in the 5G core that are expected to be instantiated, scaled and terminated without Or minimal manual intervention.

The NEF 70 is used for exposing network capabilities and events to an AF.

As shown in FIG. 1, the NFs are connected by means of so-called reference points (N1 to N9) and service based interfaces (Nnrf, Npcf, Nams, Nsmf, Nnef, Naf). This representation of reference points N1 to N33 is used for illustrating how data flows are developed. It is to be noted that EAS and AF have different interfaces (Naf and N6) to connect with the 5GS.

Figure 2:
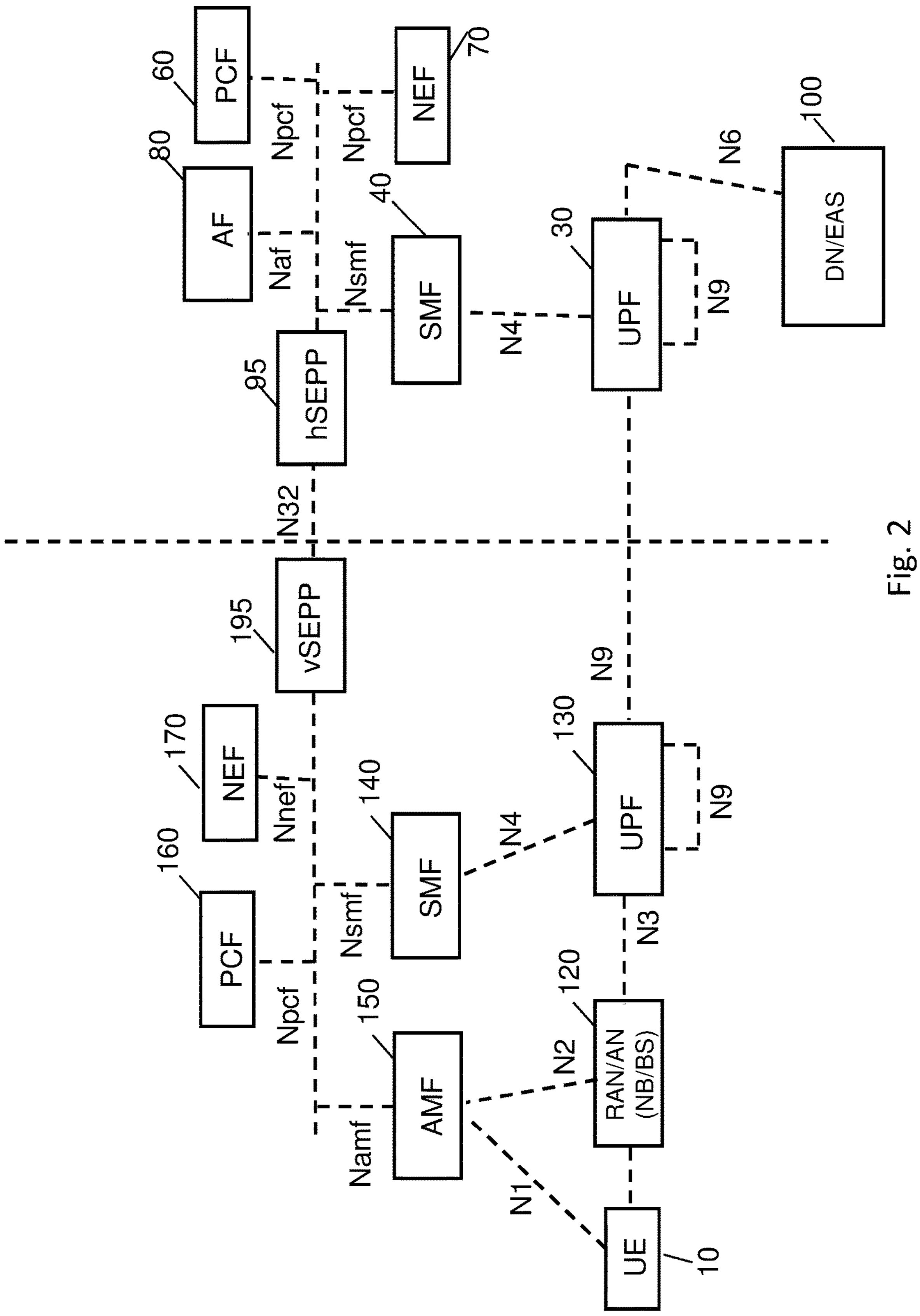
FIG. 2 shows a diagram illustrating an example of a system architecture of a wireless communication network in which examples of embodiments are implementable.

FIG. 2 shows a further diagram illustrating another example of a system architecture of a wireless communication network in which examples of embodiments are implementable. Specifically, the example illustrated in FIG. 2 is also related to 5GS based network connected to one or more edge application servers (EAS) hosted in an edge hosting environment; however, in the example shown in FIG. 2 a roaming case is shown in which a UE 10 is located in a visited communication network part (located on the left side of the dashed vertical line) while being connected to the home communication network part (at the right side).

In the visited network, similar to the example shown in FIG. 1, the communication network comprises various NFs. As shown in FIG. 2, the CN NFs comprises, amongst others (not shown), an AMF 150, a session management function (SMF) 140, a policy control function (PCF) 160, a network exposure function (NEF) 170, and one or more user plane function(s) (UPF) 130. Connections and interfaces between these elements are comparable to the exampled described in FIG. 1. The home communication network part is based, for example, on a system like that described in connection with FIG. 1.

One connection between the home and the visited communication network parts is established via UPFs 130, 30 using a N9 reference point.

Furthermore, as a link between home and visited communication networks, security edge protection proxies (SEPP), i.e. a vSEPP 195 at the visited network and a hSEPP 95 at the home network being linked via N32 reference points, are linked to the respective core network parts and linked to each other. SEPP enables secure interconnect between 5G networks, and ensures end-to-end confidentiality and/or integrity between source and destination network for all 5G interconnect roaming messages.

Figure 3:
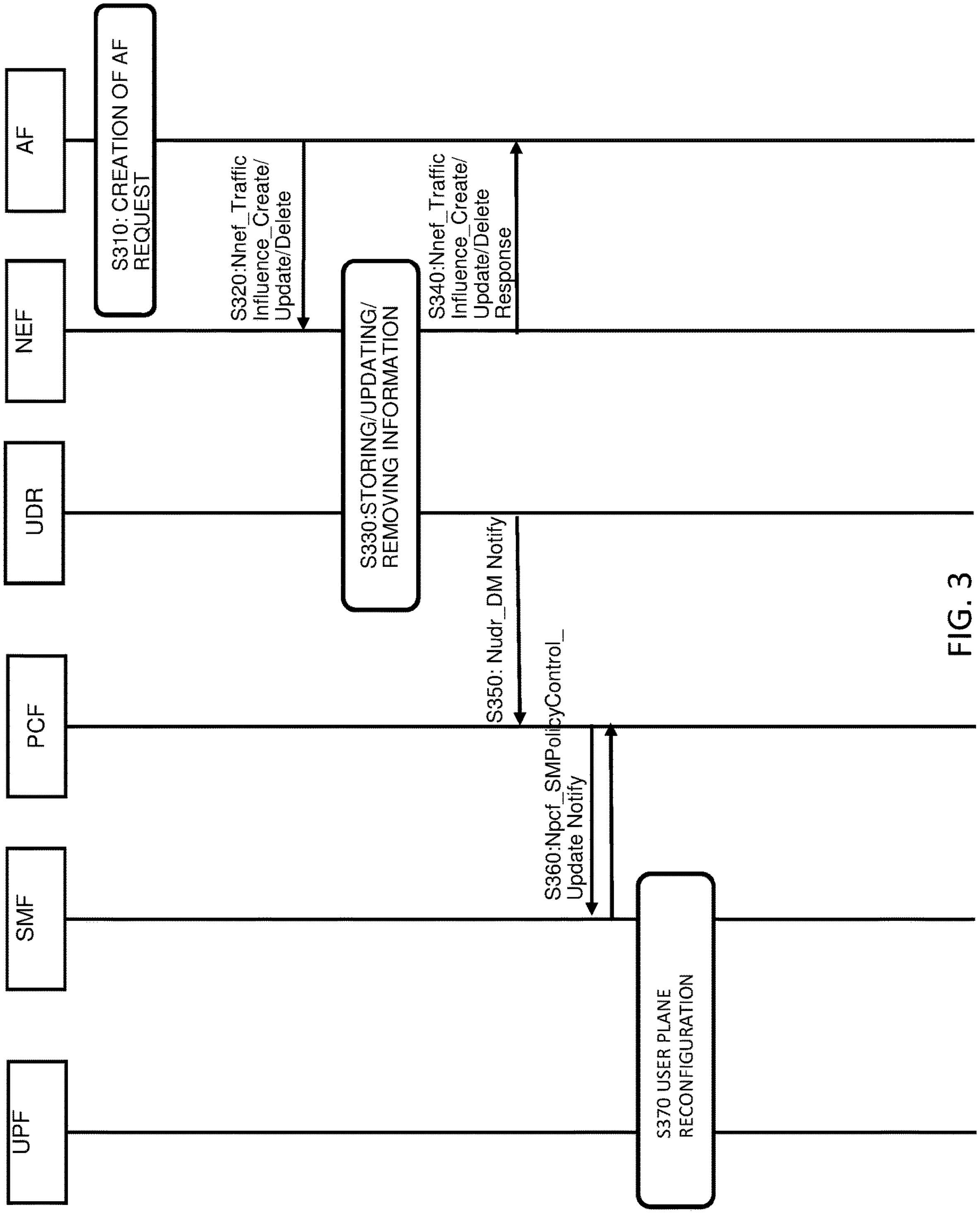
FIG. 3 shows a signaling diagram illustrating a procedure related to a processing of AF requests.

FIG. 3 shows a signaling diagram illustrating a procedure related to a processing of AF requests. Specifically, FIG. 3 illustrates a procedure between an AF and the SMF to maintain an efficient user plane path for Application Functions that require it.

Basically, an AF can send requests to influence SMF routing decisions for User Plane traffic of PDU Sessions. The AF requests may influence UPF (re)selection and allow routing of user traffic to a local access (identified by a DNAI) to a DN. The AF may also provide in its request subscriptions to SMF events.

In order to create a new request, the AF invokes, for example, in S310 an Nnef_TrafficInfluence_Create service operation. The request contains, for example, an AF Transaction Id. If it subscribes to events related with PDU Sessions, the AF indicates also where it desires to receive the corresponding notifications (AF notification reporting information). It is to be noted that in order to update or remove an existing request, the AF invokes an Nnef_TrafficInfluence_Update or Nnef_TrafficInfluence_Delete service operation providing the corresponding AF Transaction ID.

In S320, the AF sends the request to the NEF. It is to be noted that the request may be also sent directly from the AF to the PCF; in this case, the AF reaches the PCF selected for the existing PDU Session by configuration or by invoking Nbsf_management_Discovery service.

The NEF ensures the necessary authorization control, including throttling of AF requests and mapping from the information provided by the AF into information needed by the 5GS.

In S330, for example in case of Nnef_TrafficInfluence_Create or Update being received in S320, the NEF stores the AF request information in the UDR (Data Set=Application Data; Data Subset=AF traffic influence request information, Data Key=AF Transaction Internal ID, etc. S-NSSAI and DNN and/or Internal Group Identifier or SUPI).

It is to be noted that in the case of Nnef_TrafficInfluence_delete, the NEF deletes the AF requirements in the UDR (Data Set=Application Data; Data Subset=AF traffic influence request information, Data Key=AF Transaction Internal ID).

Furthermore, in S340, the NEF responds to the AF, according to the received signal.

In S350, the PCF(s) that have subscribed to modifications of AF requests (Data Set=Application Data; Data Subset=AF traffic influence request information, Data Key=S-NSSAI and DNN and/or Internal Group Identifier or SUPI) receive(s) a Nudr_DM_Notify notification of data change from the UDR.

In S360, the PCF determines if existing PDU Sessions are potentially impacted by the AF request. For each of these PDU Sessions, the PCF updates the SMF with corresponding new PCC rule(s) by invoking Npcf_SMPolicyControl_UpdateNotify service operation.

If the AF request includes a notification reporting request for UP path change, the PCF includes in the PCC rule(s) the information required for reporting the event, including the Notification Target Address pointing to the NEF or AF and the Notification Correlation ID containing the AF Transaction Internal ID.

In S370, when a PCC rule is received from the PCF, the SMF may take appropriate actions to reconfigure the User plane of the PDU Session (for example: adding, replacing or removing a UPF in the data path to e.g. act as a branching point; allocate a new prefix to the UE; updating the UPF in the target DNAI with new traffic steering rules; subscribe to notifications from the AMF for an Area Of Interest, e.g. via Namf_EventExposure_Subscribe service operation).

Figure 4:
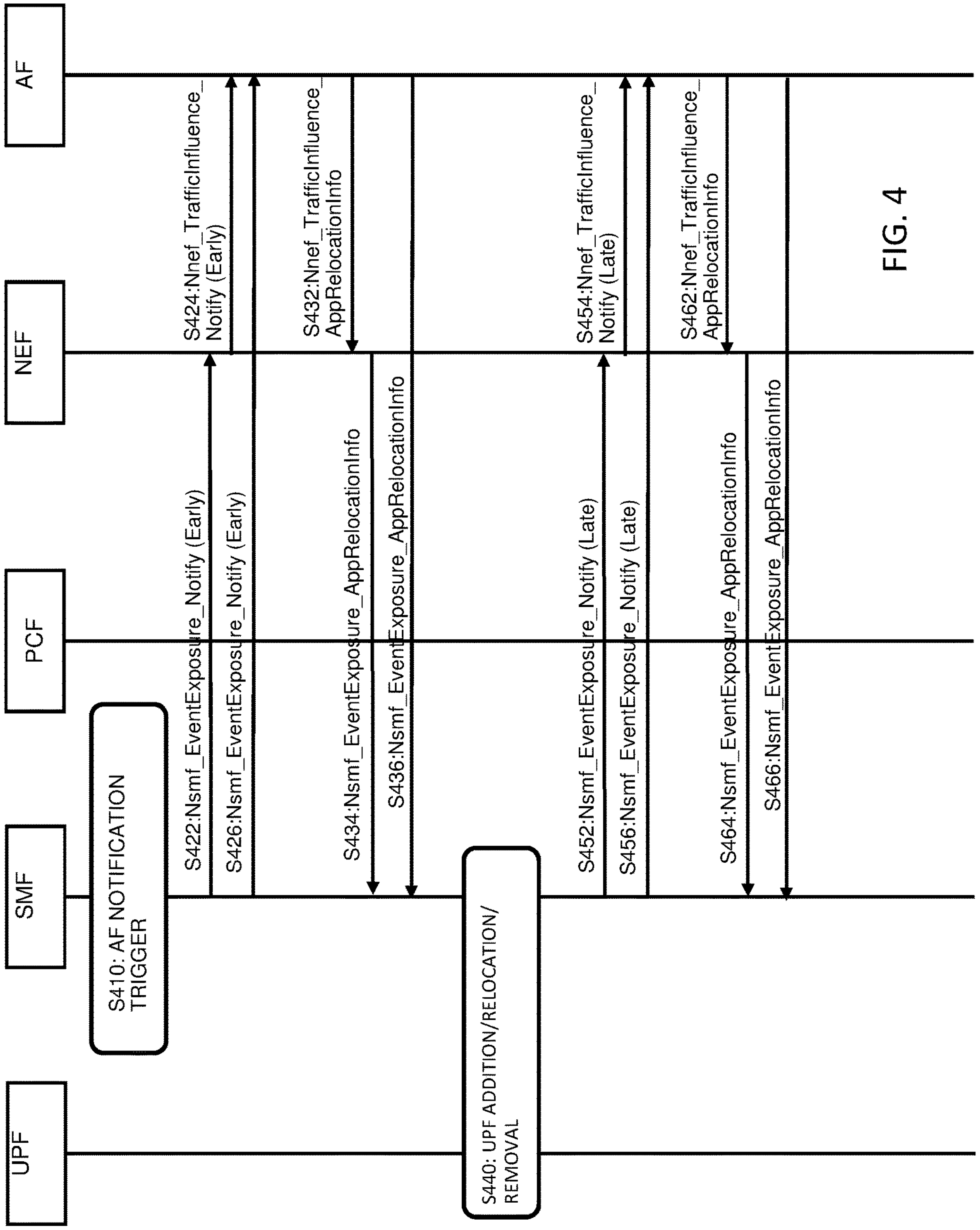
FIG. 4 shows a signaling diagram illustrating a procedure related to a processing for notifying a network related event.

FIG. 4 shows a signaling diagram illustrating a procedure related to a processing for notifying a network related event; specifically, FIG. 4 illustrates a procedure for notification of user plane events.

Specifically, FIG. 4 describes a case where the SMF intends to send a notification to the AF, e.g. in case the AF had subscribed to user plane management event notifications. The following are the examples of such events: a PDU Session Anchor identified in the AF subscription request has been established or released; a DNAI has changed; the SMF has received a request for AF notification and the on-going PDU Session meets the conditions to notify the AF, Ethernet PDU Session Anchor Relocation.

The SMF uses notification reporting information received from PCF to issue the notification either via an NEF or directly to the AF.

In S410, a condition or trigger for an AF notification has been met, as described above. The SMF sends a notification to the NF that is subscribed for SMF notifications. Further processing of the SMF notification depends on the receiving NF.

For example, in case an early notification via NEF is requested by the AF, the SMF notifies the NEF in S422 of the target DNAI of the PDU Session by invoking Nsmf_EventExposure_Notify service operation. When the NEF receives Nsmf_EventExposure_Notify, the NEF performs in S424 an information mapping (e.g. AF Transaction Internal ID provided in Notification Correlation ID to AF Transaction ID etc.), and triggers the appropriate Nnef_TrafficInfluence_Notify message.

Alternatively to the above, in S426, when a direct communication with the AF takes place, if early direct notification is requested by the AF, the SMF notifies the AF of the target DNAI of the PDU Session by invoking Nsmf_EventExposure_Notify service operation.

In S432, the AF replies to Nnef_TrafficInfluence_Notify by invoking Nnef_TrafficInfluence_AppRelocationInfo service operation either immediately or after any required application relocation in the target DNAI is completed. The AF may include N6 traffic routing details corresponding to the target DNAI. The AF may reply in negative e.g. if the AF determines that the application relocation cannot be completed successfully and/or on time.

In S434, when the NEF receives Nnef_TrafficInfluence_AppRelocationInfo, the NEF triggers the appropriate Nsmf_EventExposure_AppRelocationInfo message to the SMF.

As an alternative to the above, in S436, the AF replies to Nsmf_EventExposure_Notify by invoking Nsmf_EventExposure_AppRelocationInfo service operation either immediately or after any required application relocation in the target DNAI is completed. AF may include N6 traffic routing details corresponding to the target DNAI. Furthermore, the AF may reply in negative e.g. if the AF determines that the application relocation cannot be completed successfully on time.

In S440, the SMF enforces the change of DNAI or addition, change, or removal of a UPF, for example.

On the other hand, in case a late notification via NEF is requested by the AF, in S452, the SMF notifies the NEF of the target DNAI of the PDU Session by invoking Nsmf_EventExposure_Notify service operation. When the NEF receives Nsmf_EventExposure_Notify, the NEF performs in S454 information mapping (e.g. AF Transaction Internal ID provided in Notification Correlation ID to AF Transaction ID, etc.), and triggers the appropriate Nnef_EventExposure_Notify message.

Alternatively to the above, in case late direct notification is requested by the AF, the SMF notifies in S456 the AF of the target DNAI of the PDU Session by invoking Nsmf_EventExposure_Notify service operation. If the SMF receives the notification of AF instance changes that indicates the target local DN is associated with another AF instance, the SMF sends notification to the target AF, and cancels any future notification message to source AF.

In S462, the AF replies to Nnef_TrafficInfluence_Notify by invoking Nnef_TrafficInfluence_AppRelocationInfo service operation either immediately or after any required application relocation in the target DNAI is completed. The AF may include N6 traffic routing details corresponding to the target DNAI. The AF may reply in negative e.g. if the AF determines that the application relocation cannot be completed successfully on time. When the NEF receives Nnef_TrafficInfluence_AppRelocationInfo, the NEF triggers in S464 the appropriate Nsmf_EventExposure_AppRelocationInfo message.

Alternatively to the above, in S466, the AF replies to Nsmf_EventExposure_Notify by invoking Nsmf_EventExposure_AppRelocationInfo service operation either immediately or after any required application relocation in the target DNAI is completed. The AF may include N6 traffic routing details corresponding to the target DNAI. Moreover, the AF may reply in negative e.g. if the AF determines that the application relocation cannot be completed successfully on time.

As described above, using edge computing deployment, it is expected that a set of edge computing functions or edge application servers running on edge hosting environment have to interact with the 5GS to access to 5GS functionality and information, and/or to provide information to 5GS for the provisioning of connectivity services supporting edge computing. Consequently, exposure of network information between the 5GS and the edge computing functions is to be controlled.

In this context, latency of network exposure needs to be considered. Network exposure mechanism in 5GS is designed based on NEF and other control plane NFs, e.g. AMF, SMF, PCF etc. For applications deployed in edge hosting environments, the EAS or AFs can be locally deployed, but usually at least some Control Plane NFs involved in network exposure, e.g. NEF and PCF, are deployed centrally in order to avoid frequently relocation. Therefore, influence on latency has to be considered in view of the network exposure path.

For some network information to be exposed, long exposure latency is tolerable. However, some real time network information, e.g. network congestion condition or real-time user path latency, can change very frequently. If this information needs to be delivered to Application servers or AFs timely, undesirable latency may make the information obsolete cause applications to adjust their behaviour (e.g. adjust the resolution of video stream, or switch levels of driving automation) based on out-of-date network information.

Examples of existing QoS information that may need to be exchanged quickly between network and Application Functions (e.g. EAS) include, for example, that the AF may subscribe to receive QoS congestion condition notifications, or that the AF may request 5GS to monitor QoS status (e.g. over-the-air and/or end-to-end data path) and receive QoS measurement reports.

That is, it is necessary to ensure that the AF can be notified about network related events. This requirement has to be also ensured when an AF relocation takes place. According to the above, the AF and the AS may be deployed locally. That means, on the other hand, e.g. due to UE mobility, the AF may change during the course of UEs inter and/or intra mobility within and/or across countries and PLMNs. Other reasons for AF relocation are e.g. instantiation and de-instantiation of AFs, e.g. by a network orchestrator, or failure conditions at a server/AF site, or processing load (congestion status) at a current AF. Then, service transfer to another AF can be made, that is a new AF takes over the service of a session or the like.

However, also in this case, any subscribed notifications still need to reach the AF in charge.

AF relocation can be also understood as that at some point in time during the session, e.g. due of UE mobility, the association between the (serving) AF and the 5GS core (e.g. the SMF/PCF/NEF) changes.

As described above, as e.g. also specified in 33GPP specification, TS 23502, the 5GS core network (e.g. the SMF) has to notify the AF (e.g. when a corresponding subscription exists) or the NEF about user place management events (e.g. a UPF modification etc.). As a matter of course there can be also other events which have to be notified to the AF and/or the NEF etc.

According to some examples of embodiments, it is proposed that, in order to ensure that network related events, requests and/or notifications can be notified to an AF, in case an AF relocation or change takes place, such a change of the AF is notified to the communication network, e.g. the 5GS. For example, such an indication is provided at least to the NEF or the PCF. Alternatively, or additionally, also other elements are informed accordingly, e.g. repository elements or functions, or the SMF/AMF.

For example, the NEF/PCF has subscribed for a corresponding indication, which is e.g. referred to as “AFchange” notification event. This subscription is made e.g. during session establishment.

According to an example of an embodiment, the communication network, e.g. the NEF and the PCF, responds to the AF change indication positively once the NEF and PCF authorized the request and successfully performed the reconfiguration of its signalling data towards the new AF. Furthermore, the NEF/PCF report the AF change also to the SMF, e.g. via a signaling path of the PCF.

On the other hand, once the SMF has processed message from the PCF, the SMF notifies the NEF about e.g. user plane management events. The NEF will then forward the event notifications to the new AF.

Alternatively, the AF can also interface directly with the PCF, instead with the NEF. In that case, the SMF can notify the new AF directly in case of user plane management events.

According to further examples of embodiments, the AF notifies a repository function, e.g. the NRF, about the change of the AF. In that case the NRF can also notify also the SMF and other NF, if interested in the event about the change of the AF.

It is to be noted that the AF indicating the change can be either the old AF or the new AF, as will be explained below.

Figure 5:
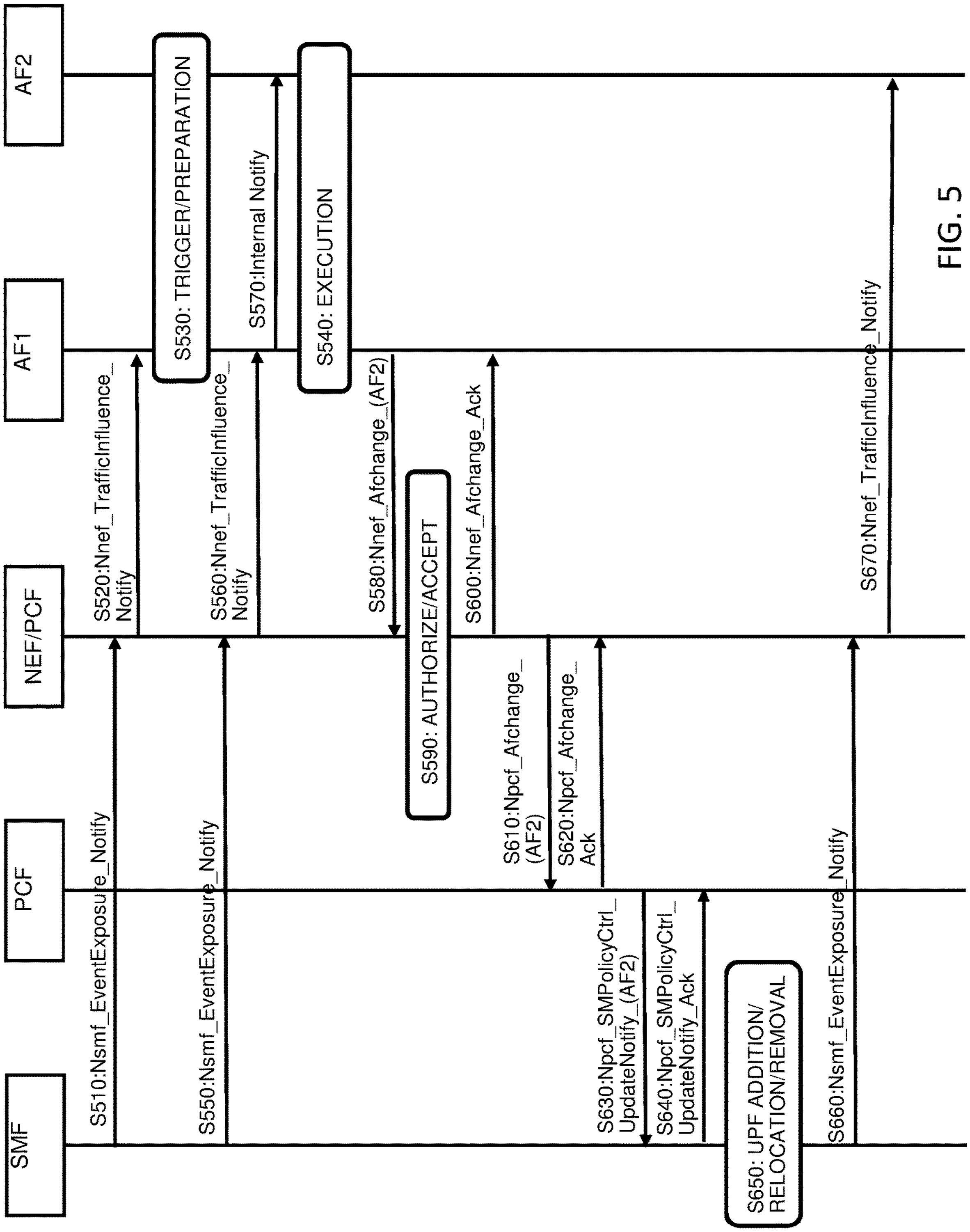
FIG. 5 shows a signaling diagram illustrating a procedure related to a processing for AF relocation according to some examples of embodiments.

FIG. 5 shows a signaling diagram illustrating a procedure related to a processing for AF relocation according to some examples of embodiments. Specifically, FIG. 5 describes a case for a reconfiguration between a “old” AF 1 and a “new” AF 2.

As a precondition for the case in FIG. 5, it is assumed that AF 1 is already instantiated and interfacing the network, i.e. it provides, for example, services to a session and is subscribed to be notified about e.g. user place events. Furthermore, it is assumed that AF 2, which represents the “new AF” to which change is to be conducted, is either already instantiated or is to be instantiated. Instantiation can be effected e.g. by the AF1 itself (e.g. by informing an instantiation instance in the network, such as an orchestrator, that a corresponding AF is to be instantiated, or by executing an instantiation procedure in another way). As another option, the AF 1 is not involved as such in the instantiation of AF 2, i.e. AF 2 is instantiated by an orchestrator.

Referring to FIG. 5, a scenario is shown which starts similar to that of FIG. 4. That is, the SMF determines that a condition or trigger for an AF notification has been met. Thus, the SMF sends a notification to the NF that is subscribed for SMF notifications. For example, the SMF notifies the NEF in S510 of the target DNAI of the PDU Session by invoking Nsmf_EventExposure_Notify service operation. When the NEF receives Nsmf_EventExposure_Notify, the NEF performs in S520 an information mapping (e.g. AF Transaction Internal ID provided in Notification Correlation ID to AF Transaction ID etc.), and triggers the appropriate Nnef_TrafficInfluence_Notify message to the (current) AF 1. Further processing is similar to that of FIG. 4, so that a description thereof is omitted here.

In S530, the AF 1 determines that a change to AF 2 has to take place. For example, based on notifications from the network, it is determined that e.g. the UE, one or more of the involved UPFs and DNAI's (it is to be noted that DNAI is pointing to the data center where the application is running) are going to “move” out of the area of responsibility of the AF1 (for instance, AF 1 is responsible for applications in an area A1 and AF 2 is responsible for applications in an area A2).

Another trigger that a change to AF 2 has to take place could be, for example, a detection at the site of the AF 1 (e.g. the server where the AF 1 is running) that the load is too high or that a failure occurred making it necessary to move to a new AF. Another trigger is e.g. when it is signaled, e.g. by the external orchestrator, that a new AF instantiated to which (e.g. for balancing reasons) some services or traffic is to be moved.

Due to this determination, the AF 1 recognizes that a new AF2 is needed. Thus, as soon as the AF2 has been instantiated or is selected, the AF 1 is made aware of the existence of the AF 2 and is instructed to transfer context data from the AF 1 to the AF 2.

For example, the orchestrator (having instantiated the AF 2) or the AF 2 itself makes the AF 1 aware of the existence of the AF2.

When, during the preparation phase in S530, the SMF sends a further notification (e.g. in S550), the NEF/PCF forwards this notification to the AF 1 in S560. The AF 1, on the other hand, forwards any ongoing notifications or requests received at the AF 1 to the AF 2 in S570 by an internal notification operation.

The AF 2 is updated with context from AF 1 (in S540) and instructed, e.g. by the orchestrator or the AF 1, to expect, receive and handle further ongoing requests and notifications being sent to the AF1 (which are forwarded by the AF1 to the AF2, or which are received from the network, e.g. the NEF).

Once both AF 1 and AF 2 are readily prepared, i.e. the change from AF 1 to AF 2 is executed in S540, the AF 1 sends an indication (here a Nnef_Afchange (newAF2)) in S580 to the (mobile) core network (i.e. the NEF/PCF).

In S590, the NEF/PCF authorizes and accepts the change. Due to this, in S600, an acknowledgement is returned to the AF 1. Furthermore, the indication (here the Nnef_Afchange (newAF2)) leads to the event that the Npcf_SMPolicyCtrl_UpdateNotify (new AF2) is forwarded to the SMF in S630 (caused by signal exchange between NEF and PCF in S610 and S620), which is acknowledged by the SMF in S640, for example.

As indicated above, before that event (in S630, S640) the SMF (and hence the NEF on receipt of Nnef_Afchange (new AF2)) forwards any new notification to the AF 1 (see S550). After the event in S630, S640, the SMF and thus the NEF forwards the notifications and ongoing requests to the AF 2. This is indicated in connection with S650, where, after the event in S630, a UPF addition/relocation/removal is determined by the SMF (i.e. a user place event). Due to this, in S660, an event exposure notification is forwarded to the NEF and to the AF 2 (in S670).

In other words, according to some examples of embodiments, the AF 1 is configured to forward the notification to AF 2, as long as the AF 1 still receives the notification and requests. According to some examples of embodiments, the AF 1 stops the forwarding e.g. after some specified period of time (when it can be assumed that the communication path to the AF 2 is completely established), or in case the AF 1 receives a corresponding indication (e.g. from the NEF or the AF 2 that AF2 has completely taken over).

As a further example of embodiments, in addition to the processing described in connection with FIG. 5, also the following configuration can be applied.

In FIG. 5, an indication referred to as "Af change" is used as a new Nnef service and a new PCF services (in S580 and S610). As an alternative, it is also possible to use a mechanism which is mapped to existing 3GPP 5GS system behaviour.

Instead of using a dedicated signaling message from the AF 1 to the NEF (i.e. Nnef_Afchange), it is possible that, after the preparation of AF1, AF2 and context relocation between them was successfully completed, the AF 1 sends, for example, a PUT or PATCH request to the NEF to update subscription data, e.g. "Individual Traffic Influence Subscription" with new address(es) where the AF 2 wants to receive future notifications. In addition, e,g. for being able to receive also future requests at the AF 2 the PUT/PATCH method/request may also carry the address of the AF 2 in order to receive subsequent requests at the AF 2 not being Notifications.

The NEF after authorization accepts the request and stores the AF request information in the UDR, similar to the process conducted in S330 of FIG. 3, for example (Data Set=Application Data; Data Subset=AF traffic influence request information, Data Key=AF Transaction Internal ID, S-NSSAI and DNN and/or Internal Group Identifier or SUPI). In turn, the UDR notifies the PCF with Nudr_DM_Notify of the changed subscription (corresponding to S350 of FIG. 3). Finally, the SMF is informed about the changes, like in S360 of FIG. 3 (Npcf_SMPolicyControl_UpdateNotify).

In accordance with this the SMF informs the NEF or the AF directly about user plane management events, like in FIG. 4, however now notifying the new AF2.

As a further alternative, as indicated above, the network (e.g. the NEF or PCF) is informed by the new AF 2, instead of the old AF 1. That is, the AF 2 sends the PATCH/PUT request to the NEF to update the subscription data (like the "Individual Traffic Influence Subscription"). Then, after authorization, the NEF may accept the request as described above and the procedure continues as described above.

Furthermore, as another alternative, the AF (AF 1 or AF 2) directly interacts with the PCF, e.g. via a corresponding interface (e.g. an N5 interface). Other processing is comparable to that described above. In that case the AF (AF1 or AF2) invokes for instance the Npcf_PolicyAuthorization_Update service operation by sending the HTTP PATCH request to the "Individual Application Session Context" resource to the PCF. The PCF in turn invokes the Npcf_SMPolicyControl_UpdateNotify service operation by sending a HTTP POST request with "{Notification URI}/update" to the SMF.

In accordance with this the SMF informs the NEF or the AF directly about the user plane management events as described in connection with FIG. 4, however now notifying the new AF 2. Similar to the above, the AF 1 forwards any other requests to the new AF 2.

Figure 6:
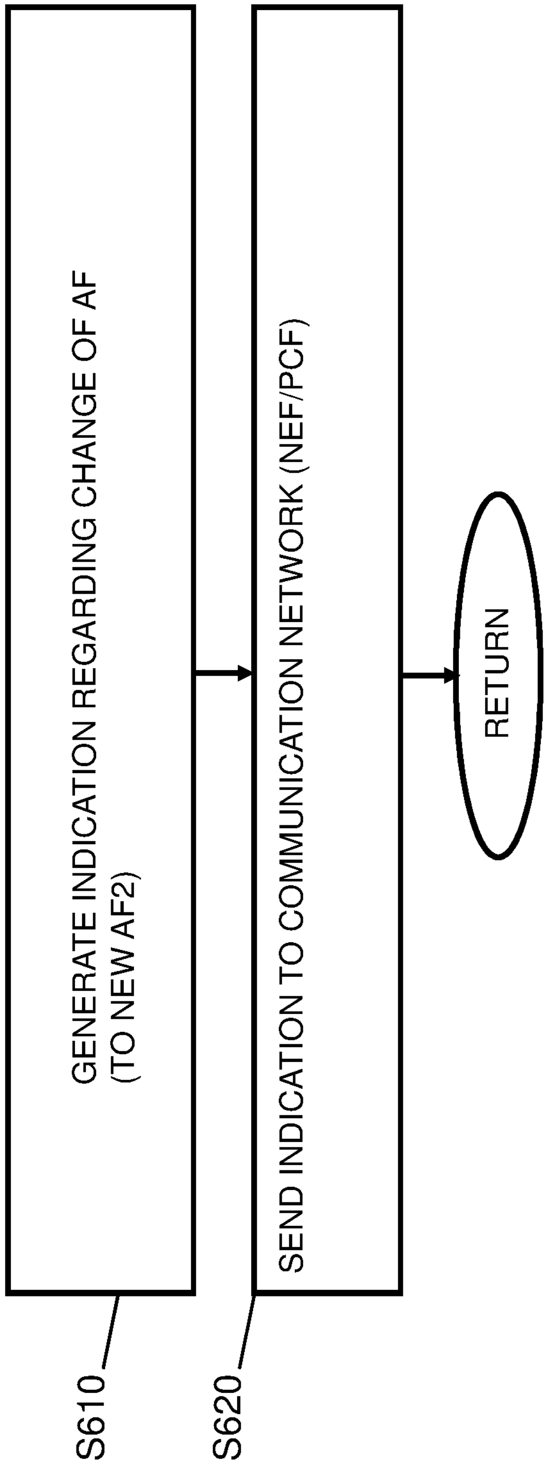
FIG. 6 shows a flow chart of a processing conducted in a network element or function acting as an AF providing part according to some examples of embodiments.

FIG. 6 shows a flow chart of a processing executed by a network element or function acting as an application function AF providing services for, for example, a communication or session in the communication network environment as described above. The AF conducting the processing shown in connection with FIG. 6 is, for example, one of the AF 1, AF 2 described in connection with FIG. 5. The communication network is based, for example, on a 3GPP standard and the network element or function configured to provide the application function may be an application server, like the EAS 100 or another server or network element (physical or virtual), located at an edge environment of the communication network.

In S610, generate an indication is generated in the AF that a change from a first application function currently providing the service to a communication session conducted in the communication network (e.g. AF 1) to a second application function providing the service to the communication session from now on (e.g. AF 2) takes place. The indication is configured such that it is able to cause an event in the communication network (e.g. in the SMF or another core network element) to switch a communication path from the first application function to the second application function.

According to some examples of embodiments, as the indication that a change from the first application function to the second application function takes place, different kinds of indication can be used. For example, one suitable indication is a specific signaling message including an information about the change, such as the AFchange signaling indicated in FIG. 5. Another suitable indication can be provided, for example, by a suitable a PUT or PATCH request which can be used for reconfiguring or modifying subscription data held in the communication network control element or function.

According to some examples of embodiments, in the indication, also address information related to the location of the second application function are included, so as to facilitate the transmissions of requests or notifications from the network to the new AF.

In S620, the indication generated in S610 is sent a communication network control element or function of the communication network.

According to some examples of embodiments, the indication is sent to one or more communication network control elements or functions of the communication network. These communication network control elements or functions include at least one of a network exposure element or function (e.g. a NEF in 5GS), a policy control element or function (e.g. a PCF in 5GS), a security edge protection proxy element or function (e.g. a SEPP in 5GS), a serving gateway element or function (e.g. a SGW-u or SGW-c), a packet gateway element or function (e.g. a PGW-u or PGW-c), a network repository element or function (e.g. a NRF in 5GS), a policy and charging rules element or function (e.g. a PCRF), a service capability exposure element or function (e.g. a SCEF in 5GS).

According to examples of embodiments, when the application function provided by the network element or function is the first application function (i.e. the indication is sent by the AF 1, for example), it is detected in the first AF (e.g. the AF 1) that the first application function currently providing the service to the communication session conducted in the communication network is not able to continue the provision of the service. Then, the second application function providing the service to the communication session from now on is determined. Then, context information of the first application function is transferred to the second application function.

Furthermore, in this case, according to examples of embodiments, when it is detected that the first application function currently providing the service to the communication session conducted in the communication network is not able to continue the provision of the service, an instantiation of the second application function is triggered. This is done, for example, by informing a network orchestrator or the like that a new AF is to be instantiated. According to further examples, the AF 1 can set up the new AF (e.g. the AF 2) by other means. The determination of the second application function (which is needed to be able to transfer the context information) is achieved by obtaining an indication of existence of the second application function after instantiation thereof is completed (e.g. by the AF 2 itself or by another element, such as the network orchestrator).

It is to be noted that according to some examples of embodiments, the AF 1 detects that the first application function currently providing the service to the communication session conducted in the communication network is not able to continue the provision of the service on the basis of information provided by the communication network; for example due to movement of a UE or the like which is part of the session for which the service is provided, the UE is out of the coverage or responsibility area of the current AF (which may be used only at a certain location in the edge environment, for example), which makes it necessary to use/instantiate a new AF. Another option causing change of the AF is, for example, when the AF or the server (e.g. EAS) on which the AF runs determines a failure or high load condition making it necessary to move at least a part of the traffic to another AF, or in case the current AF is to be de-instantiated or deactivated, for which the current AF is then provided with corresponding information. Furthermore, another option is, for example, when a network orchestrator or the like has instantiated a new AF which is to be used by traffic in the network, in which case information provided from the external network orchestrator element or function can cause a change of the AF for at least some of the present traffic.

According to examples of embodiments, the current AF (e.g. AF 1) forwards notifications and requests received from the communication network concerning network related events to the second application function. Forwarding the notifications and requests to the second application function is stopped when either a predetermined amount of time is lapsed (e.g. when it can be assumed that the path switching is done) or when an indication is received (e.g. from the AF 2 or from the network) that the communication path from the communication network control element or function (e.g. the PCF or NEF) to the second application function is established.

On the other hand, when the application function which generates and sends the indication is the new AF (e.g. AF 2), context information of the first application function is received and processed in the preparation phase. Then, the AF 2 can receive, from the first application function or a communication network control element or function of the communication network, and process notifications and requests originating from the communication network concerning network related events.

Furthermore, in this case, according to examples of embodiments, the presence of the second application function is indicated to the first application function.

Figure 7:
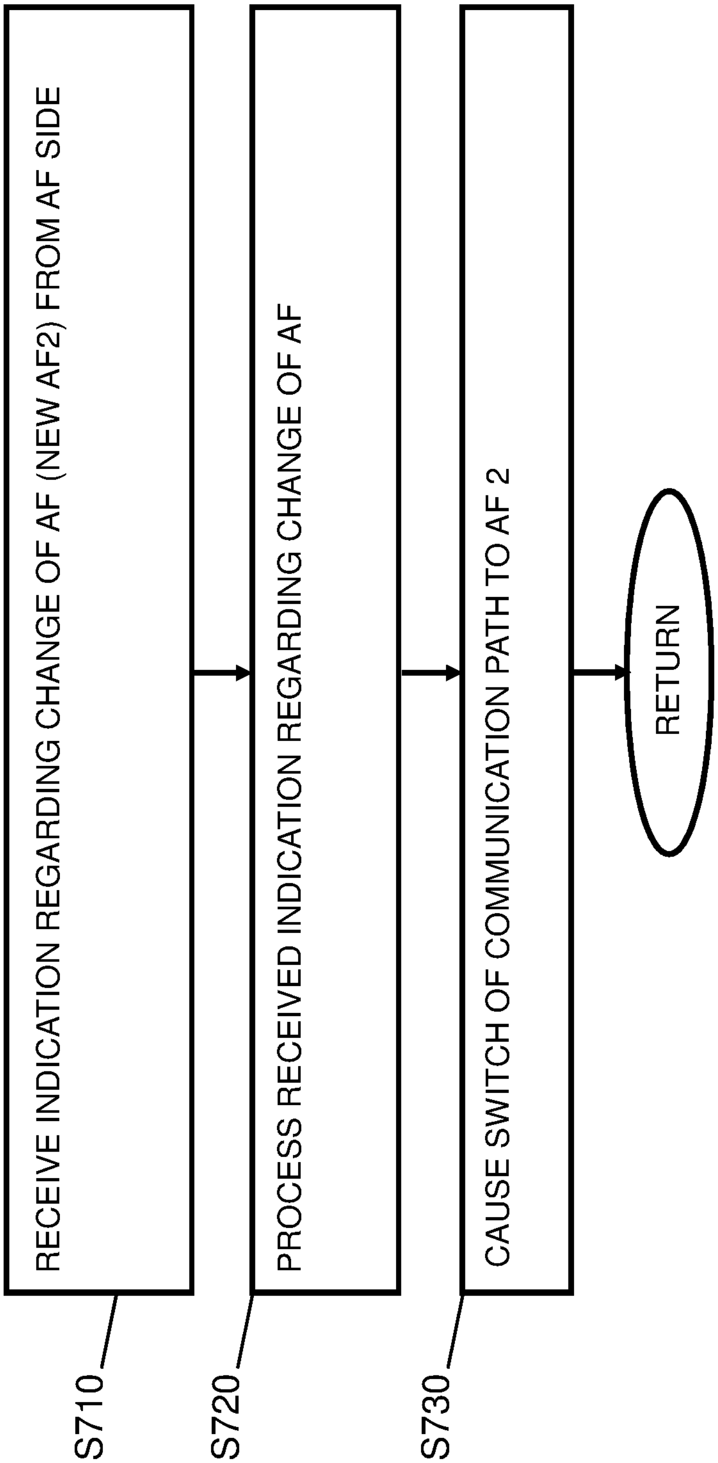
FIG. 7 shows a flow chart of a processing conducted in a network element or function acting as a communication network control element or function according to some examples of embodiments.

FIG. 7 shows a flow chart of a processing executed by a communication network control element or function acting cooperating with an application function (AF) providing services for, for example, a communication or session in the communication network environment as described above. The communication network control element or function shown in connection with FIG. 7 is, for example, the PCF or NEF described in connection with FIG. 5. The communication network is based, for example, on a 3GPP standard and the network element or function configured to provide the application function may be an application server like the EAS 100 or another server or network element (physical or virtual), located at an edge environment of the communication network.

In S710, an indication that a change from a first application function (e.g. AF 1) currently providing a service to a communication session conducted in the communication network to a second application function (e.g. AF 2) providing the service to the communication session from now on takes place. In S720, the indication is processed.

For example, according to examples of embodiments, as the indication that a change from the first application function to the second application function takes place, different kinds of indication can be received and processed. For example, one indication being used is a specific signaling message including an information about the change, such as the AFchange signaling indicated in FIG. 5. Another suitable indication is, for example, a suitable a PUT or PATCH request which can be used for reconfiguring or modifying subscription data held in the communication network control element or function.

According to some examples of embodiments, in the indication, also address information related to the location of the second application function are included, so as to facilitate the transmissions of requests or notifications from the network to the new AF.

In S730, a switch of a communication path in the communication network from the first application function to the second application function is caused, on the basis of the indication.

According to some examples of embodiments, when the indication is received, at least one further (i.e. second) communication network control element or function of the communication network is informed by the communication network control element or function that a change from the first application function to the second application function takes place, on the basis of the received indication. The information is provided, for example, by means of a corresponding signaling procedure, as indicated, as an example, in FIG. 5.

For example, the first communication network control element or function includes at least one of a network exposure element or function (e.g. a NEF in 5GS), a policy control element or function (e.g. a PCF in 5GS), a serving gateway element or function (e.g. SGW-u or SGW-c), a packet gateway element or function (e.g. PGW-u, PGW-c), a network repository element or function (e.g. a NrF in 5GS), a policy and charging rules element or function (e.g. a PCRF), a service capability exposure element or function (e.g. a SCEF). On the other hand, the second communication network control element or function (i.e. the element or function being informed by the communication network control element of function having received the indication from an AF) includes at least one of a policy control element or function (e.g. a PCF in 5GS), a security edge protection proxy element or function (e.g. a SEPP in 5GS), a serving gateway element or function (e.g. SGW-u or SGW-c), a packet gateway element or function (e.g. PGW-u or PGW-c), a session management element or function (e.g. a SMF in 5GS), an access and mobility element or function (e.g. an AMF in 5GS).

According to some examples of embodiments, notifications and requests are forwarded to the first application function concerning network related events until the communication path is established to the second application function (switching of the path is triggered e.g. by the indication). On the other hand, forwarding of the notifications and requests to the first application function is stopped, while the notifications and requests are forwarded to the second application function when the communication path to the second application function is established.

Figure 8:
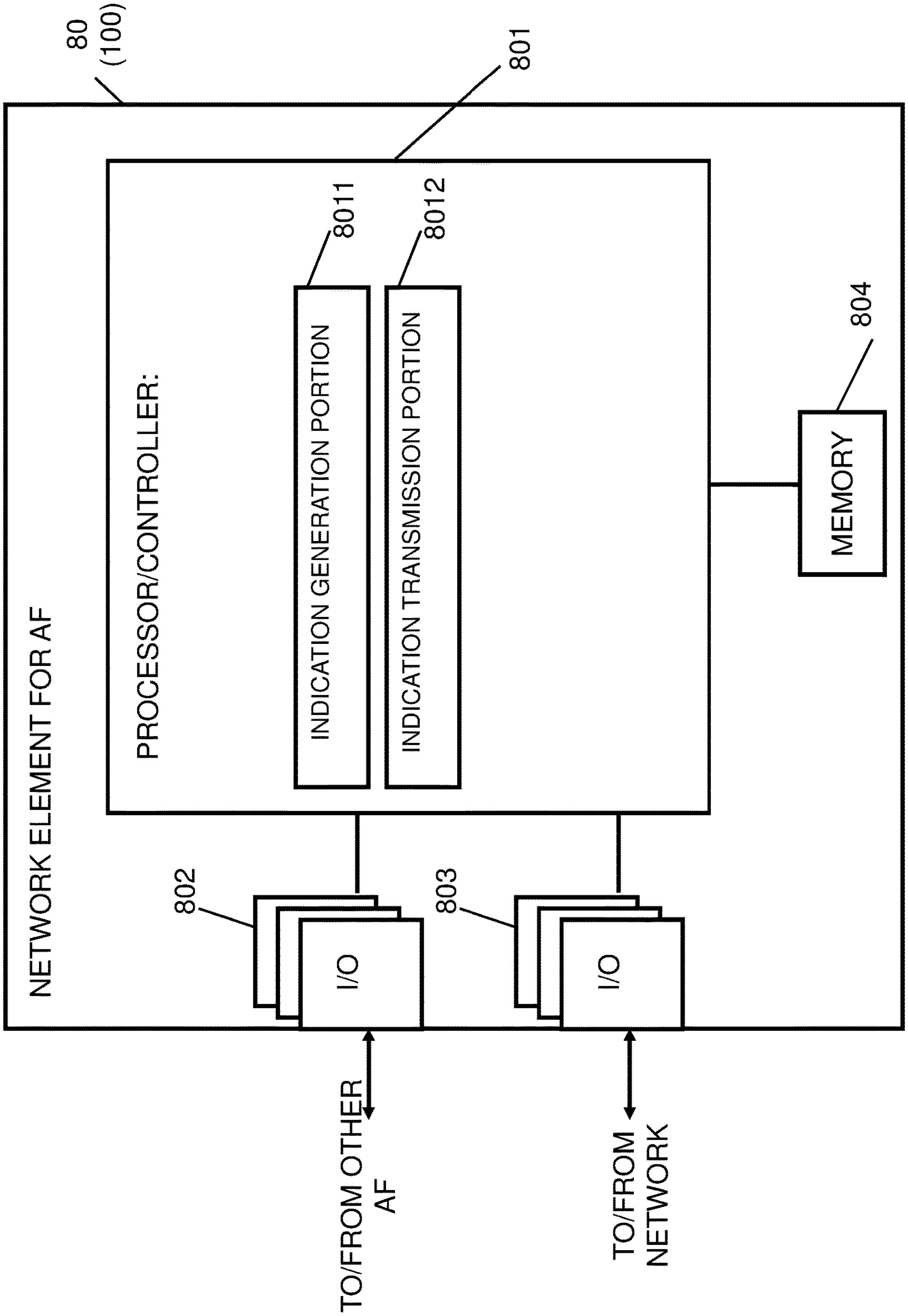
FIG. 8 shows a diagram of a network element or function representing an AF providing part according to some examples of embodiments.

FIG. 8 shows a diagram of a network element or function providing an application function AF 80. The AF 80 resides, for example, together with an application server, like EAS 100 or another type of server, in the edge hosting environment, according to some examples of embodiments, as described in connection with FIGS. 1 to 5, and is configured to conduct a control processing for AF relocation according to examples of embodiments of the disclosure. It is to be noted that the network element or function, like the AF 80, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The network element or function 80 shown in FIG. 8 may include a processing circuitry, a processing function, a control unit or a processor 801, such as a CPU or the like, which is suitable for executing instructions given by programs or the like related to the control procedure. The processor 801 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 802 and 803 denote input/output (I/O) units or functions (interfaces) connected to the processor or processing function 801. The I/O units 802 may be used for communicating with another AF, such as for a communication between AF 1 and AF 2 as described above, for example. The I/O units 803 may be used for communicating with network elements or functions of the communication network e.g. the 3GPP network, as described in connection with FIGS. 1 to 5. The I/O units 802 and 803 may be combined units including communication equipment towards several entities, or may include a distributed structure with a plurality of different interfaces for different entities. Reference sign 804 denotes a memory usable, for example, for storing data and programs to be executed by the processor or processing function 801 and/or as a working storage of the processor or processing function 801. It is to be noted that the memory 804 may be implemented by using one or more memory portions of the same or different type of memory.

The processor or processing function 801 is configured to execute processing related to the above described control processing. In particular, the processor or processing circuitry or function 801 includes one or more of the following sub-portions. Sub-portion 8011 is a processing portion which is usable as a portion for generating an indication regarding the AF change. The portion 8011 may be configured to perform processing according to S610 of FIG. 6. Furthermore, the processor or processing circuitry or function 801 may include a sub-portion 8012 usable as a portion for transmitting the indication. The portion 8012 may be configured to perform a processing according to S620 of FIG. 6.

Figure 9:
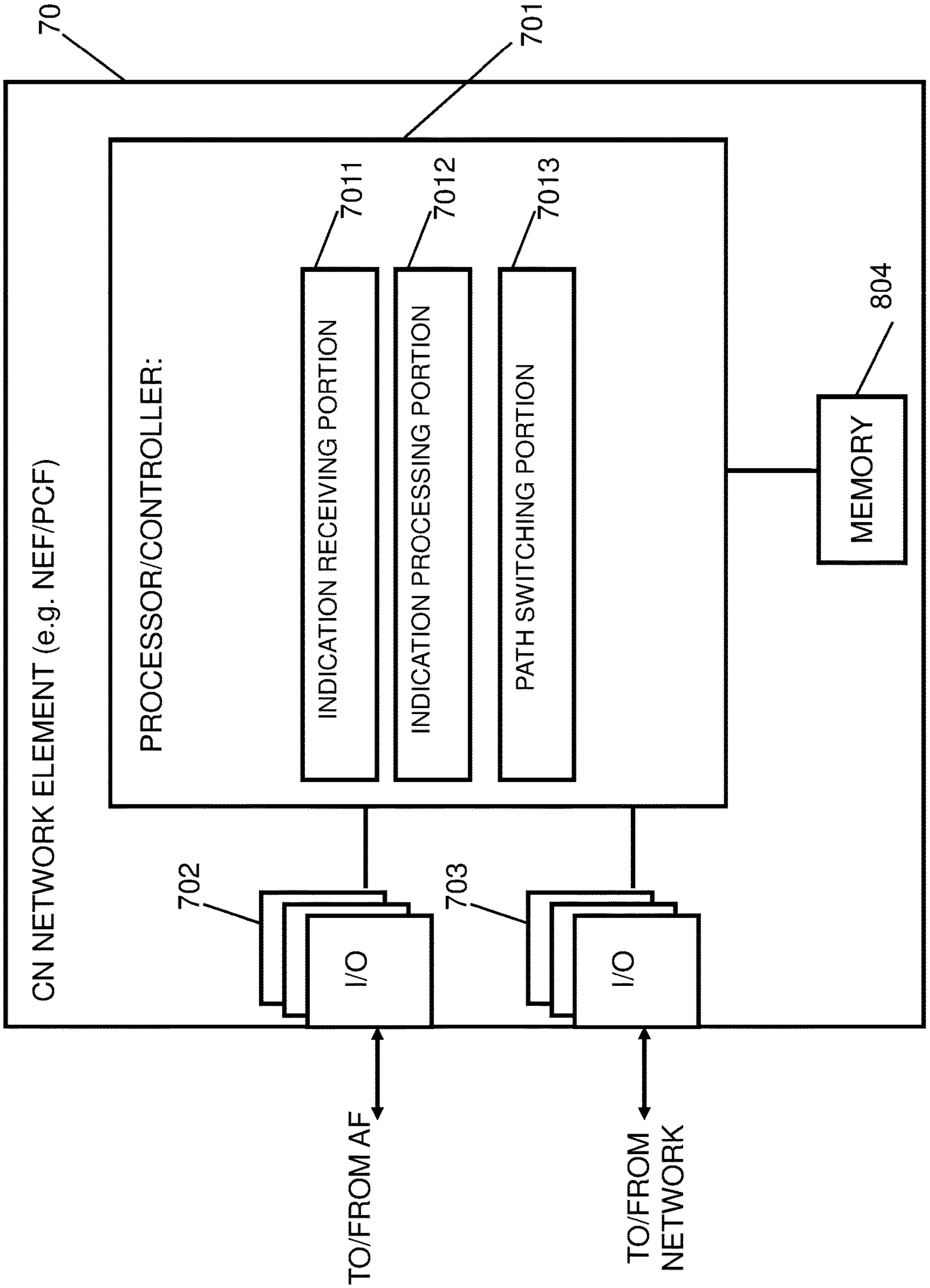
FIG. 9 shows a diagram of a network element or function representing a communication network control element or function according to some examples of embodiments.

FIG. 9 shows a diagram of a communication network control element or function such as, for example, the NEF or PCF as described in connection with FIGS. 1 to 5, according to some examples of embodiments, which is configured to conduct a control processing for AF relocation according to examples of embodiments of the disclosure. It is to be noted that the communication network control element or function, like the NEF 70 or PCF, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element or function 70 shown in FIG. 9 may include a processing circuitry, a processing function, a control unit or a processor 701, such as a CPU or the like, which is suitable for executing instructions given by programs or the like related to the control procedure. The processor 701 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 702 and 703 denote input/output (I/O) units or functions (interfaces) connected to the processor or processing function 701. The I/O units 702 may be used for communicating with an AF, such as for a communication with AF 1 and AF 2 as described above, for example. The I/O units 703 may be used for communicating with other communication network control elements or functions of the communication network e.g. the 3GPP network, as described in connection with FIGS. 1 to 5. The I/O units 702 and 703 may be combined units including communication equipment towards several entities, or may include a distributed structure with a plurality of different interfaces for different entities. Reference sign 704 denotes a memory usable, for example, for storing data and programs to be executed by the processor or processing function 701 and/or as a working storage of the processor or processing function 701. It is to be noted that the memory 704 may be implemented by using one or more memory portions of the same or different type of memory.

The processor or processing function 701 is configured to execute processing related to the above described control processing. In particular, the processor or processing circuitry or function 701 includes one or more of the following sub-portions. Sub-portion 7011 is a processing portion which is usable as a portion for receiving an indication regarding the AF change. Sub-portion 7012 is a processing portion which is usable as a portion for processing the indication regarding the AF change. The portions 7011 and 7012 may be configured to perform processing according to S710 and S720 of FIG. 7. Furthermore, the processor or processing circuitry or function 701 may include a sub-portion 7013 usable as a portion for conducting a processing regarding a path switching. The portion 7013 may be configured to perform a processing according to S730 of FIG. 7.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the disclosure based on the principles defined.

Furthermore, it is to be noted that while the above described examples are related to the usage of the proposed mechanisms in a 5GS environment, it is also possible to adapt corresponding measures to other types of networks, such as 4G and 3G communication networks. Furthermore, regarding the network elements or functions involved in the procedures according to examples of embodiments, while the above described examples refer e.g. to the NEF or the PCF as the communication network control element or function involved in the processing, it is also possible to use e.g. elements or functions like SCEF or PCRF in this regard. Similarly, instead of using the SMF as one party in the procedure as described above, it is also conceivable to provide corresponding functions by means of the AMF.

Basically, processings or functions described in connection with AF, NEF, PCF, SMF, UPF as described above represent only one of possible application examples. Other examples may be based e.g. on the usage of SGW-C, SGW-U and PGW-C, PGW-U. In a roaming scenario, for example, functions provided e.g. by the V-SMF may be implemented in connection with a SEPP, for example.

With regard to the notifications and requests to be forwarded from the network to the AF, examples being described above are related to user plane management events; however, such events represent only one possible example. Rather, also other event types can be processed.

According to a further example of embodiments, there is provided, for example, an apparatus for use by a network element or function configured to provide an application function providing a service in a communication network, the apparatus comprising means configured to generate and to send, to a communication network control element or function of the communication network, an indication that a change from a first application function currently providing the service to a communication session conducted in the communication network to a second application function providing the service to the communication session from now on takes place, wherein the indication is configured to cause an event in the communication network to switch a communication path from the first application function to the second application function.

Furthermore, according to some other examples of embodiments, the above defined apparatus may further comprise means for conducting at least one of the processing defined in the above described methods, for example a method according to that described in connection with FIG. 6.

According to a further example of embodiments, there is provided, for example, an apparatus for use by a first communication network control element of function of a communication network, the apparatus comprising means configured to receive and process an indication that a change from a first application function currently providing a service to a communication session conducted in the communication network to a second application function providing the service to the communication session from now on takes place, and means configured to cause a switch of a communication path in the communication network from the first application function to the second application function on the basis of the indication.

Furthermore, according to some other examples of embodiments, the above defined apparatus may further comprise means for conducting at least one of the processing defined in the above described methods, for example a method according to that described in connection with FIG. 7.

According to a further example of embodiments, there is provided, for example, a non-transitory computer readable medium comprising program instructions for causing an apparatus to perform, when conducting a control processing for providing an application function providing a service in a communication network and for relocating the application function, at last to generate and send, to a communication network control element or function of the communication network, an indication that a change from a first application function currently providing the service to a communication session conducted in the communication network to a second application function providing the service to the communication session from now on takes place, wherein the indication is configured to cause an event in the communication network to switch a communication path from the first application function to the second application function.

According to a further example of embodiments, there is provided, for example, a non-transitory computer readable medium comprising program instructions for causing an apparatus to perform, when conducting a control processing for an application function relocation, at least to receive and process an indication that a change from a first application function currently providing a service to a communication session conducted in the communication network to a second application function providing the service to the communication session from now on takes place, and to cause a switch of a communication path in the communication network from the first application function to the second application function on the basis of the indication.

By means of the measures described above, it is possible to ensure that an AF can be located locally e.g. at the edge, if needed, while it is possible to maintain service continuity during relocation of the AF, e.g. when the UE moves outside the reach of the AF or due to other reasons requiring a change of the AF, such as congestion, de-instantiation of the AF, or the like. The local deployment of AF at the edge as required by low-latency requiring services, such as URLLC services, where a low latency needs to be maintained, allows thus to provide service continuity even when relocation of the AF is required, e.g. due to highly mobile UEs. Furthermore, as indicated above, according to examples of embodiments, measures are provided allowing a flexible implementation of the procedures described above in various types of networks, such as 3G, 4G and 5G networks according to 3GPP standards, wherein network operators can implement corresponding measures according to their requirements in various parts of the network.

It should be appreciated that

- an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.
- embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.
- implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).
- embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described,
- an apparatus may be implemented by a semiconductor chip, a chipset, or a (hardware) module including such chip or chipset;
- embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.
- embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus, comprising:

at least one processor; and at least one memory storing instructions of a first application function providing a service in a communication network, which, when executed by the at least one processor, cause the apparatus to perform:

sending, to a communication network control element of the communication network, an indication indicating that a change from the first application function currently providing the service to a communication session conducted in the communication network to a second application function providing the service to the communication session from now on is to take place, wherein the indication is configured to cause the communication network control element to switch a communication path from the first application function to the second application function;

prior to the sending, detecting that the first application function currently providing the service to the communication session conducted in the communication network is not able to continue the provision of the service, and determining the second application function providing the service to the communication session from now on;

receiving, from the communication network control element of the communication network, an acknowledgment that the change is authorized and accepted by the communication network control element;

transferring context information of the first application function to the second application function; and forwarding notifications and requests received from the communication network concerning network related events to the second application function for a predetermined amount of time.

2. The apparatus according to claim 1, wherein the indication that a change from the first application function to the second application function takes place comprises:

a specific signaling message including an information about the change, or one of a PUT or PATCH request for reconfiguring or modifying subscription data held in the communication network control element.

3. The apparatus according to claim 1, wherein the indication comprises address information related to the location of the second application function.

4. The apparatus according to claim 1, wherein the communication network control element comprises at least one communication network control element of the communication network, the at least one communication network control element comprising at least one of the following: a network exposure element, a policy control element, a security edge protection proxy element, a serving gateway element, a packet gateway element, a network repository element, a policy and charging rules element, or a service capability exposure element.

5. The apparatus according to claim 1, wherein the instructions, when executed by the at least one processor, further cause the apparatus to perform:

triggering, when it is detected that the first application function currently providing the service to the communication session conducted in the communication network is not able to continue the provision of the service, an instantiation of the second application function, and determining the second application function by obtaining an indication of existence of the second application function after instantiation thereof is completed.

6. The apparatus according to claim 1, wherein the instructions, when executed by the at least one processor, further cause the apparatus to perform:

detecting that the first application function currently providing the service to the communication session conducted in the communication network is not able to continue the provision of the service on the basis of one of information provided by the communication network, information obtained by the first application function or information provided from an external network orchestrator element.

7. The apparatus according to claim 1, wherein the instructions, when executed by the at least one processor, further cause the apparatus to perform:

transmitting, to the second application function, the context information of the first application function, and transmitting, to the second application function or another communication network control element of the communication network the notifications and requests originating from the communication network concerning network related events for the predetermined amount of time.

8. The apparatus according to claim 7, wherein the instructions, when executed by the at least one processor, further cause the apparatus to perform:

receiving an indication of a presence of the second application function.

9. The apparatus according to claim 1, wherein the communication network is based on a 3GPP standard and the communication network element comprises an application server located at an edge environment of the communication network.

10. A method, comprising:

sending, by a first application function that is configured to provide a service in a communication network, to a communication network control element of the communication network, an indication indicating that a change from the first application function currently providing the service to a communication session conducted in the communication network to a second application function providing the service to the communication session from now on is to take place, wherein the indication is configured to cause the communication network control element to switch a communication path from the first application function to the second application function;

prior to the sending, detecting that the first application function currently providing the service to the communication session conducted in the communication network is not able to continue the provision of the service, and determining the second application function providing the service to the communication session from now on;

receiving, from the communication network control element of the communication network, an acknowledgment that the change is authorized and accepted by the communication network control element;

transferring context information of the first application function to the second application function; and forwarding notifications and requests received from the communication network concerning network related events to the second application function for a predetermined amount of time.

11. The method according to claim 10, wherein the indication that a change from the first application function to the second application function takes place comprises:

a specific signaling message including an information about the change, or one of a PUT or PATCH request for reconfiguring or modifying subscription data held in the communication network control element.

12. The method according to claim 10, wherein the indication comprises address information related to the location of the second application function.

13. The method according to claim 10, wherein the communication network control element comprises at least one communication network control element of the communication network, the at least one communication network control element comprising at least one of the following: a network exposure element, a policy control element, a security edge protection proxy element, a serving gateway element, a packet gateway element, a network repository element, a policy and charging rules element, or a service capability exposure element.

14. The method according to claim 10, further comprising:

triggering, when it is detected that the first application function currently providing the service to the communication session conducted in the communication network is not able to continue the provision of the service, an instantiation of the second application function, and determining the second application function by obtaining an indication of existence of the second application function after instantiation thereof is completed.

15. The method according to claim 10, further comprising:

detecting that the first application function currently providing the service to the communication session conducted in the communication network is not able to continue the provision of the service on the basis of one of information provided by the communication network, information obtained by the first application function or information provided from an external network orchestrator element.

16. The method according to claim 10, wherein, when the application function provided by the network element is the second application function, the method further comprises:

transmitting, to the second application function, the context information of the first application function, and transmitting, to the second application function or another communication network control element of the communication network the notifications and requests originating from the communication network concerning network related events for the predetermined amount of time.

17. The method according to claim 16, further comprising:

receiving an indication of a presence of the second application function.

18. The method according to claim 10, wherein the communication network is based on a 3GPP standard and the communication network control element comprises an application server located at an edge environment of the communication network.

19. A non-transitory computer-readable medium having instructions encoded thereon which, when executed by a first application function, cause the first application function to perform a method comprising:

sending, to a communication network control element of a communication network, an indication indicating that a change from the first application function currently providing a service to a communication session conducted in the communication network to a second application function providing the service to the communication session from now on is to take place, wherein the indication is configured to cause the communication network control element to switch a communication path from the first application function to the second application function;

prior to the sending, detecting that the first application function currently providing the service to the communication session conducted in the communication network is not able to continue the provision of the service;

determining the second application function providing the service to the communication session from now on;

receiving, from the communication network control element of the communication network, an acknowledgment that the change is authorized and accepted by the communication network control element;

transferring context information of the first application function to the second application function; and forwarding notifications and requests received from the communication network concerning network related events to the second application function for a predetermined amount of time.

* * * * *